(12) United States Patent
Findley et al.

(10) Patent No.: US 9,248,588 B2
(45) Date of Patent: Feb. 2, 2016

(54) MELTABLE CRACK SEALANT PACKAGING

(71) Applicant: P & T PRODUCTS, INC., Sandusky, OH (US)

(72) Inventors: Jennifer Findley, Sandusky, OH (US); Derek Dranichak, Dublin, OH (US)

(73) Assignee: P & T PRODUCTS, INC., Sandusky, OH (US)

( * ) Notice: Subject to any disclaimer, the term of this patent is extended or adjusted under 35 U.S.C. 154(b) by 0 days.

(21) Appl. No.: 14/195,361

(22) Filed: Mar. 3, 2014

(65) Prior Publication Data

US 2014/0248082 A1 Sep. 4, 2014

Related U.S. Application Data

(60) Provisional application No. 61/772,058, filed on Mar. 4, 2013.

(51) Int. Cl.
| | |
|---|---|
| *E01C 23/14* | (2006.01) |
| *B29C 39/00* | (2006.01) |
| *E01C 11/00* | (2006.01) |
| *B65D 21/02* | (2006.01) |
| *B65D 25/32* | (2006.01) |
| *B65D 43/02* | (2006.01) |
| *B65D 71/00* | (2006.01) |
| *B29C 39/10* | (2006.01) |

(52) U.S. Cl.
CPC .......... *B29C 39/003* (2013.01); *B65D 21/0219* (2013.01); *B65D 25/32* (2013.01); *B65D 43/0212* (2013.01); *E01C 11/005* (2013.01); *B29C 39/10* (2013.01); *B29K 2995/0069* (2013.01); *B65D 71/0096* (2013.01); *B65D 2543/0074* (2013.01); *B65D 2543/00092* (2013.01); *B65D 2543/00296* (2013.01); *B65D 2543/00537* (2013.01); *B65D 2543/00629* (2013.01); *B65D 2543/00685* (2013.01); *B65D 2543/00796* (2013.01)

(58) Field of Classification Search
USPC ........................... 404/67, 75, 77, 79; 524/543
See application file for complete search history.

(56) References Cited

U.S. PATENT DOCUMENTS

| | | | | |
|---|---|---|---|---|
| 5,733,616 | A | * | 3/1998 | Janicki et al. ................. 428/35.7 |
| 5,765,686 | A | * | 6/1998 | Wright ..................... B65D 1/22 206/447 |
| 5,989,662 | A | * | 11/1999 | Janicki ................... B65B 63/08 206/447 |

(Continued)

OTHER PUBLICATIONS

Crafco Inc., Product Data Sheet, Roadsaver 211, Jan. 1, 2008 (and attached undated photograph of product).

(Continued)

*Primary Examiner* — Thomas B Will
*Assistant Examiner* — Katherine Chu
(74) *Attorney, Agent, or Firm* — Rankin, Hill & Clark LLP

(57) ABSTRACT

A meltable crack sealant package that includes a polymeric container and a crack sealant material contained therein. The polymeric container includes a bottom portion including a rigid base and an upwardly extending rigid sidewall that terminates in and define an opening. The rigid base and upwardly extending rigid sidewall cooperate to define a reservoir. A rigid lid portion operatively engages with the bottom portion to close off the opening and thereby seal the crack sealant material within the reservoir in a watertight manner. Methods of making and using the meltable crack sealant package are also disclosed.

13 Claims, 4 Drawing Sheets

(56) References Cited

U.S. PATENT DOCUMENTS

| | | | | |
|---|---|---|---|---|
| 5,992,628 | A | * | 11/1999 | Vermilion et al. ............ 206/447 |
| 6,107,373 | A | * | 8/2000 | Janicki et al. .................... 524/59 |
| 8,017,681 | B2 | * | 9/2011 | Guymon et al. .............. 524/543 |
| 8,114,494 | B2 | * | 2/2012 | Marchal ..................... 428/36.92 |
| 8,283,409 | B2 | * | 10/2012 | Guymon ............ B65D 21/0223 206/524.7 |
| 8,952,089 | B2 | * | 2/2015 | Guymon ............ B65D 21/0223 206/524.7 |
| 2007/0027235 | A1 | * | 2/2007 | Marchal .............. C08L 23/0853 524/59 |
| 2013/0075298 | A1 | | 3/2013 | Chehovits et al. |
| 2014/0033650 | A1 | | 2/2014 | Splinter et al. |

OTHER PUBLICATIONS

Crafco Inc., Meltable Packaging, Aug. 1, 2012.
Webpage http://www.maxwellproducts/com dated Apr. 8, 2010 as retrieved from the Internet Archive Wayback Machine (and attached undated product literature).
Webpage http://www.rightpointe.com/joint_sealants.html as retrieved from the Internet Archive Wayback Machine (and attached undated enlarged photo).

* cited by examiner

MELTABLE CRACK SEALANT PACKAGING

BACKGROUND OF INVENTION

1. Field of Invention

The present invention relates to crack sealant packaging and methods of packaging crack sealant and using the same.

2. Description of Related Art

"Crack sealant" is general term for materials which are used to fill and thereby seal cracks and joints in asphalt and cement pavement surfaces. Crack sealant materials are sometimes also referred to in the art by terms such as, for example: hot pour; crack seal; crack sealer; crack sealant; crack fill; crack filler; joint seal; joint sealer; joint sealant; joint fill; joint filler; rubberized asphalt; tar; polymer-modified asphalt; thermoplastic-modified asphalt; para-plastic materials; rubber-modified asphalt; traffic loop detector sealant; waterproofing membrane asphalt; modified asphalt; roofing asphalt; cold joint adhesives; marker adhesives; and other asphalt/resin/polymer compositions. Throughout the present specification and in the appended claims, the term "crack sealant" will be used exclusively, but the term should be understood to encompass all materials having the same general composition, use and/or properties. Crack sealant is widely used to fill and thereby seal cracks and joints in highways, streets, parking lots and driveways from water penetration. The use of crack sealants prolongs the service life of such pavement surfaces.

Crack sealant formulations vary widely depending upon manufacturer and depending upon the particular end use application for which they are intended. In general, crack sealants are composed of base asphalt (bitumen), polymer/rubber copolymers (e.g., styrene-butadiene-styrene copolymers), extenders and reinforcing fillers. At most ambient storage and transportation temperatures, crack sealant compositions tend to be in solid form. At the time of use, crack sealants are heated to temperatures whereby they become a molten liquid and are then applied in a heated liquid form by pouring and/or pumping. The molten liquid seeps into and fills the cracks and joints and then, upon cooling, re-solidifies within the cracks and joints thereby sealing/filling same.

Most crack sealant material is supplied to end users in poly bag-lined, rectangular corrugated boxes. At the time of manufacture, the corrugated box is lined with the poly bag. Molten crack sealant material is poured into the poly bag-lined corrugated box. Once the desired amount of crack sealant (e.g., 20-60 lbs.) has been poured into the poly bag lining the corrugated box, the crack sealant composition is permitted to cool, whereupon it solidifies and takes the rectangular shape defined by the interior space of the corrugated box.

Packaging of this type provides certain advantages and disadvantages. Advantageously, the rectangular corrugated packages can be stacked on pallets and shipped to job sites. The corrugated packages provide a flat surface, which can bear identification information. At the time of use, the poly bags containing the crack sealant can be withdrawn from the corrugated box and inserted into the melting equipment together with the crack sealant material, with the poly bag melting and becoming part of the molten end use material. The corrugated boxes can be recycled.

Disadvantageously, the corrugated boxes must be collected at the job site for recycling. In blustery conditions, the empty corrugated boxes can be blown away from their intended staging location. In wet conditions, the corrugated boxes can break down before or after the crack sealant has been used. And, the corrugated boxes are susceptible to damage (e.g., deformation) due to compression (e.g., from the weight of the material itself, when stacked).

Alternative crack sealant packaging is available in the marketplace. For example, Maxwell Products Incorporated of Salt Lake City, Utah supplies crack sealant packaged within a thermoplastic container that comprises an expanded polymer (expanded polystyrene). Upon information and belief, applicant believes such packaging is described in U.S. Pat. No. 8,017,681 to Guymon et al. Packaging of this type provides certain advantages and disadvantages. The principal advantage is that the expanded polymer "shell" surrounding the crack sealant material can be inserted into the melting equipment together with the crack sealant material, with the expanded polymer melting and becoming part of the molten end use material. This means that it is no longer necessary to stage corrugated boxes at the job site for later recycling. Another advantage is that the expanded polymer "shell" is somewhat water resistant, which allows it to be stored in wet environments for short periods of time. Disadvantageously, containers of this type are relatively expensive as compared to corrugated boxes, require much more storage and transportation space (i.e., the packaging has much thicker bottom, top and sidewalls as compared to a corrugated box), and can become damaged if mishandled due to the inherent fragility of expanded polystyrene. Furthermore, due to the thickness of the containers, less crack sealant can be delivered to the melting equipment per charge.

Crafco Inc. of Chandler, Ariz. markets crack sealant in meltable packaging under the PLEXI-MELT™ brand. Upon information and belief, such product consists of a rectangular block of solidified crack sealant disposed in a poly bag, which is overwrapped with and thereby enveloped within a non-woven fiber packaging film material that is the same as or similar to the non-woven polyethylene packaging material available from DuPont Industrial Packaging under the TYVEK® brand. Advantageously, the non-woven packaging film material surrounding the crack sealant material can be inserted into the melting equipment together with the crack sealant material, with the non-woven packaging film material melting and becoming part of the molten end use material. Again, this prevents the need to stage corrugated boxes at the job site. Another advantage is that the non-woven packaging film material is somewhat water resistant, which allows the product to be stored in wet environments with less concern that water will damage the container as compared to conventional corrugated box packaging. Furthermore, the wrapping is substantially thinner, by comparison, than meltable expanded polymer packaging. Disadvantageously, containers of this type are relatively expensive as compared to corrugated boxes, are somewhat difficult to handle (they are more slippery than cardboard boxes) and, the packaging material can become brittle after prolonged exposure to sunlight.

There is a substantial need for improved meltable crack sealant packaging.

BRIEF SUMMARY OF THE INVENTION

In view of the foregoing, the present invention is directed toward meltable crack sealant packaging and methods of packaging crack sealant and using the same that overcome the limitations of the prior art. Meltable crack sealant packaging according to the present invention comprises a polymer container, which is preferably made of polypropylene, and a polymer lid, which is also preferably made of polypropylene, and which is secured to the polymer container after the polymer container has been filled with meltable crack sealant. In a preferred embodiment, the container also comprises a carry handle, which pivots from a non-operational position where the handle is disposed proximal to a sidewall of the container to an operational position where the handle is disposed above the lid.

Packaging according to the invention can be melted together with the crack sealant composition contained within using conventional crack sealant heating equipment, and once melted becomes an accessory component of the applied crack sealant composition that imparts desirable properties including, but not limited to, lower surface tack, higher softening point and lower penetration. Packaging according to the invention is very rugged and can be handled during transit and/or on the job site in a rough manner without concern that the packaging will become damaged. The packaging is watertight, and can be stored outside in all weather conditions without damage to the packaging or to the crack sealant stored within. The packaging according to the invention does not take up significant volume, and provides sufficient rigidity to be self-supporting and stackable. In one embodiment, the bottom of the container is received within a depression or recess formed in the lid of the container. In another embodiment, the sidewalls preferably taper from the opening that engages with the lid toward the base, which allows the base of one container to rest within a recess formed in the lid of another container. Both configurations permit the containers to be stacked on pallets in a very stable manner, without concern that the individual containers will slide away from each other during transit or storage.

The foregoing and other features of the invention are hereinafter more fully described and particularly pointed out in the claims, the following description setting forth in detail certain illustrative embodiments of the invention, these being indicative, however, of but a few of the various ways in which the principles of the present invention may be employed.

DETAILED DESCRIPTION OF THE INVENTION

Figure 1:
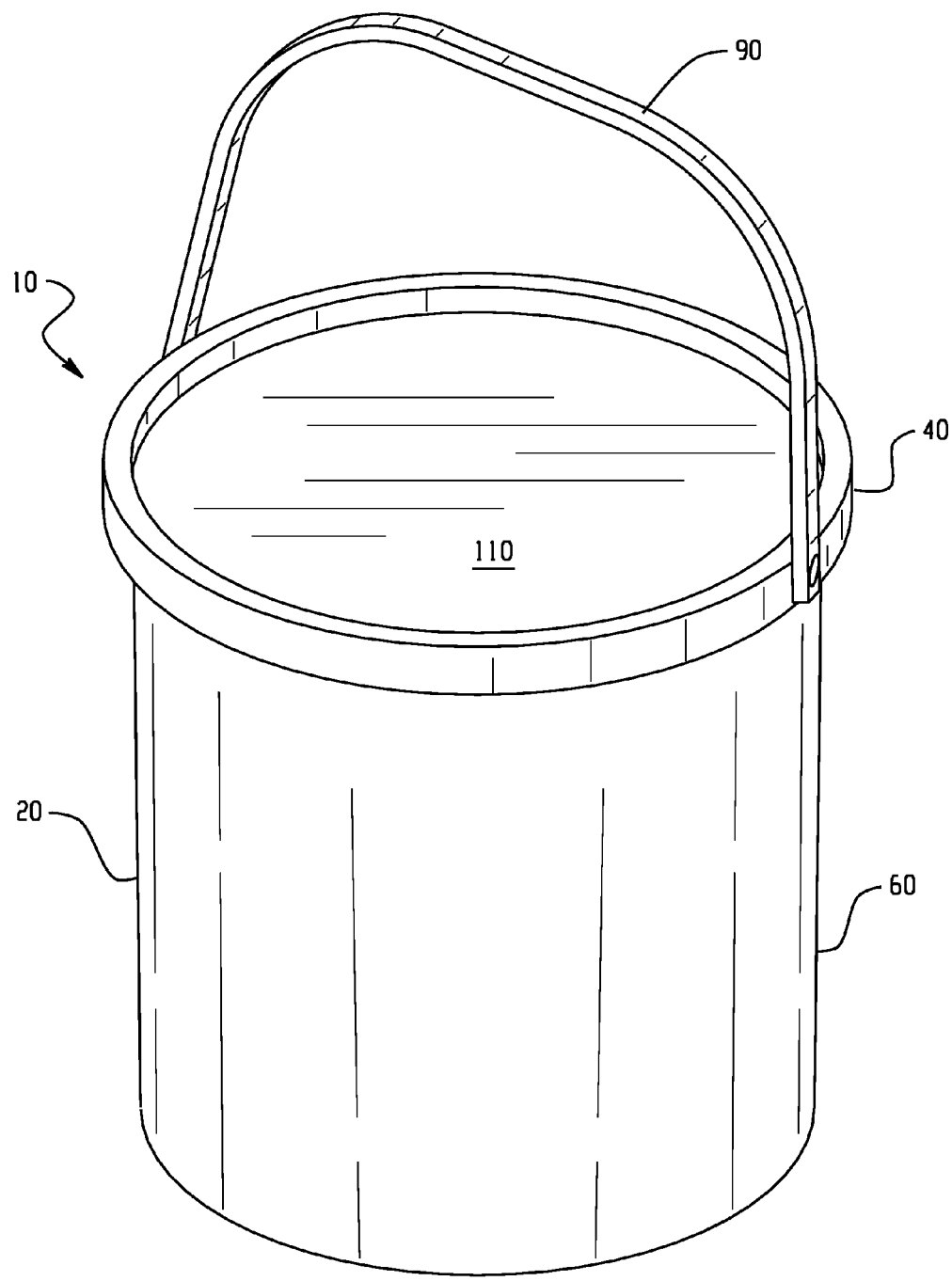
FIG. 1 is a perspective view showing an upper portion of an exemplary crack sealant package according to the invention.
Figure 2:
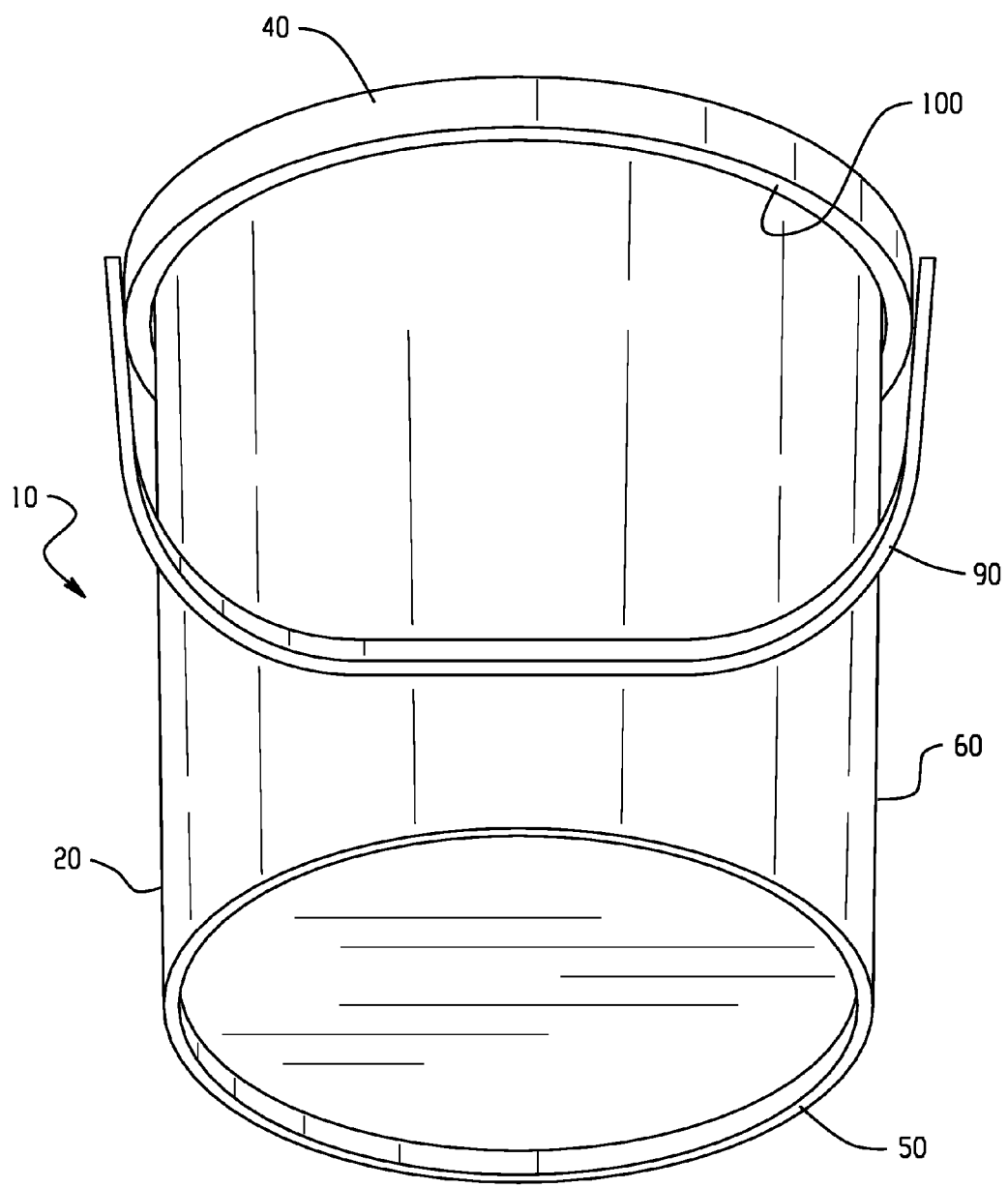
FIG. 2 is a perspective view showing a lower portion of another exemplary crack sealant package.

As noted above, FIGS. 1 and 2 are perspective views showing upper and lower portions, respectively, of exemplary crack sealant packages 10 according to the invention. In each illustrated embodiment, the meltable crack sealant package comprises a polymeric container 20 that defines a receptacle 30 having an internal volume, and a polymeric lid 40 that engages with and closes off the polymeric container to seal the volume of the receptacle in an air-tight and water-tight manner. The polymeric container preferably comprises a base portion 50, which is preferably substantially horizontal. Sidewalls 60 extend generally upwardly from a periphery of the base portion and terminate in a rim 70, which defines an opening. The sidewalls are preferably continuous, meaning that they do not meet in sharp corners. In both of the illustrated embodiments, the container is circular in horizontal cross section. However, it is contemplated that other shapes could be utilized, such as rectangular shapes, which preferably transition from one side of the container to another on a continuous radius (i.e., without sharp corners). Preferably, the polymeric container and the polymeric lid have a wall thickness sufficient to impart enough rigidity to allow the meltable crack sealant package to be self-supporting, and also to allow a plurality of packages of crack sealant (e.g., from about 2 to about 12, and preferably about 5 up to about 10) to be stacked atop each other without causing deformation. A wall thickness of about 100 mils or so is generally regarded as being sufficient, when the container is made of polypropylene homopolymer.

Figure 3:
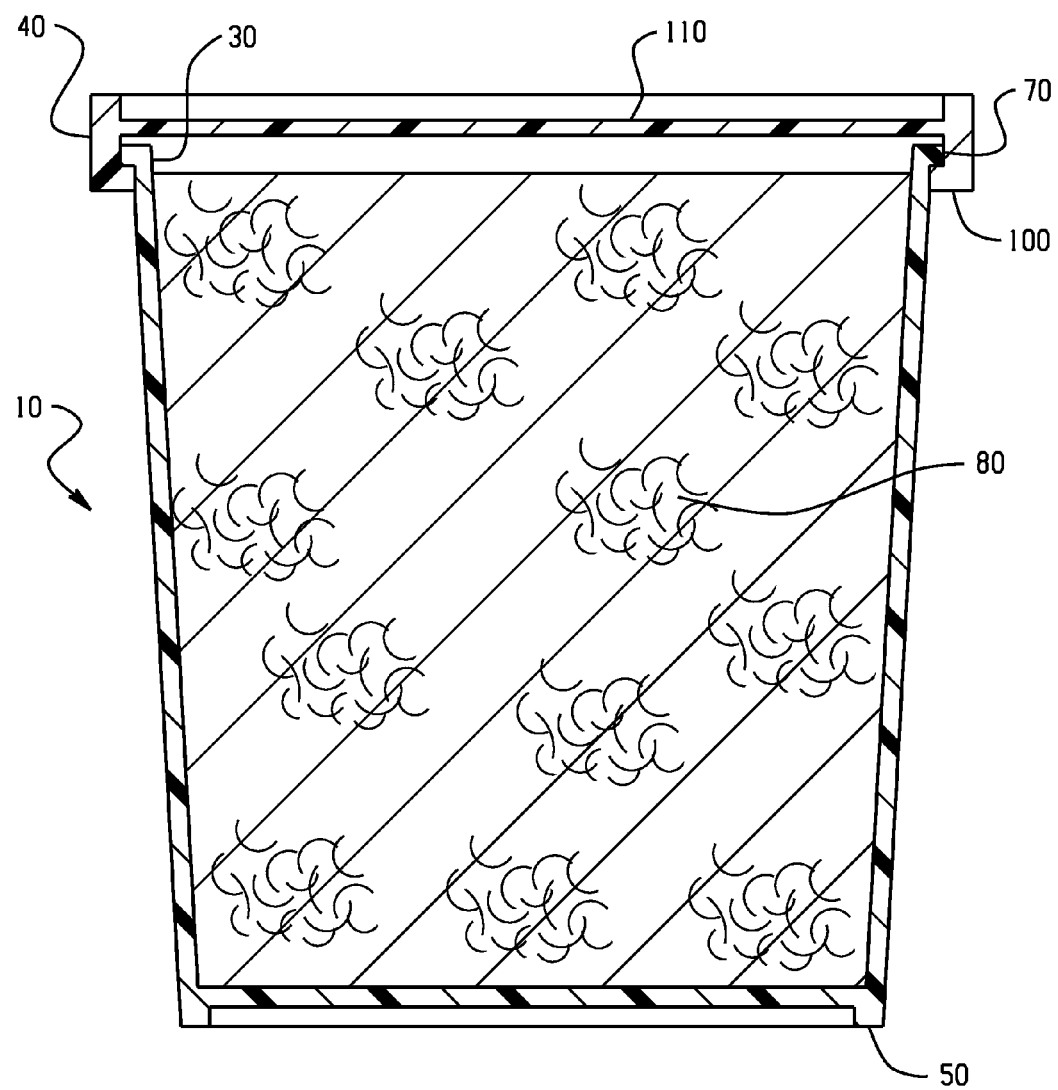
FIG. 3 is a section view taken vertically through the center of the exemplary crack sealant package shown in FIG. 2.

With reference to FIG. 3, a crack sealant material 80 is contained within the sealed volume of the container. The crack sealant material is a solid at temperatures up to at least 100° F., but is capable of being heated together with the container within which it is contained to an application temperature to form a molten liquid material for application to pavement surfaces to seal joints and cracks therein.

In the preferred embodiment, the polymeric container comprises non-expanded polypropylene homopolymer, which provides sufficient rigidity and also impact resistance, which makes it durable. In the preferred embodiment, the reservoir is capable of containing approximately 20-40 lbs. of crack sealant material, although containers of larger or smaller size could be utilized within the scope of the invention, if desired.

Figure 4:
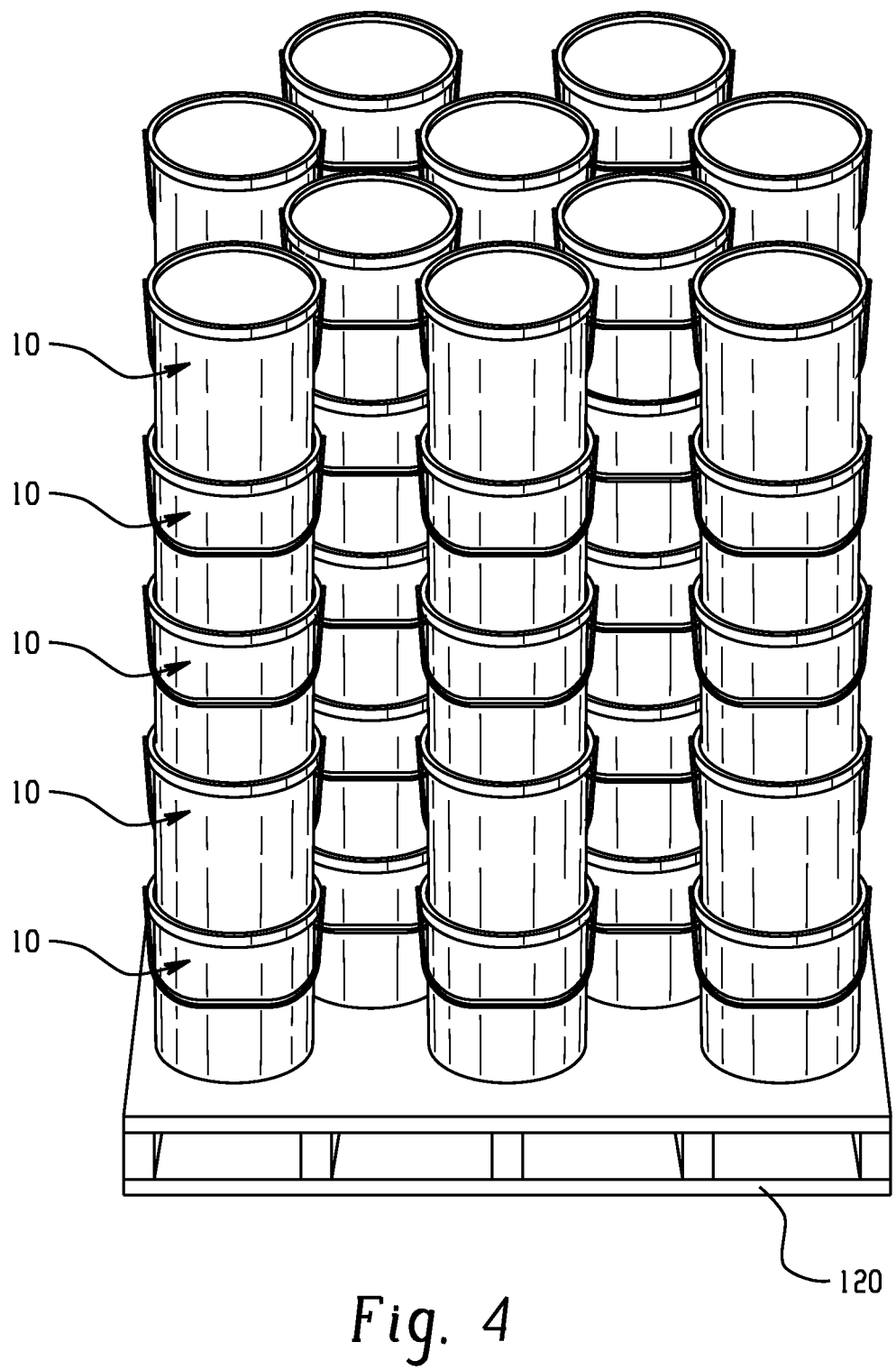
FIG. 4 is a perspective view showing fifty (50) exemplary crack sealant packages as shown in FIG. 1 disposed on a pallet.

The crack sealant material, which generally comprises a mixture of base asphalt (bitumen), polymer/rubber copolymers (e.g., styrene-butadiene-styrene copolymers), extenders and reinforcing fillers is heated to a temperature within the range of about 200° F. to about 400° F. and mixed until all components are dissolved and/or uniformly dispersed and are in the form of a molten liquid. The temperature of the crack sealant material is reduced to a temperature below about 300° F. and then the desired quantity is poured into the reservoir. The polypropylene lid is then secured to the rim portion of the container to seal the crack sealant material therein. As illustrated in FIG. 4, filled, sealed containers can then be stacked on a pallet for cooling, stocking and shipping. Labels can be applied to the containers before or after they are filled with the crack sealant material. Alternatively, the polymeric containers and/or the polymeric lids can be printed or otherwise marked before or after the container is filled with crack sealant material. The use of printed shrink-films and other polymeric markings is also contemplated.

Preferably, the meltable crack sealant package comprises a handle 90 that is pivotally secured to the lid portion or to the polymeric container. In a preferred embodiment, the handle is selectively movable between a non-operational position (see FIG. 2), wherein the handle is adjacent to one of said plurality of upwardly extending rigid sidewalls, and an operational position (see FIG. 1), wherein said handle is above said lid portion. A handle makes it easy for an end user to lift and carry the meltable crack sealant package to the heating equipment. And the use of a handle that can be moved between a non-operational position and an operational position allows for the presence of a handle without interfering with the stackability of the packages. Alternatively, the rim of the polymeric container extends outwardly from the sidewall of the polymeric container to form a side lip 100, which can be used to help lift and carry the packaged crack sealant material.

In another preferred embodiment, an area of the opening in the polymeric container is larger than the periphery of the base portion, and the polymeric lid includes a recess 110 that is dimensioned to receive the base portion of an identical meltable crack sealant package. To facilitate this arrangement, it is possible for the sidewalls to be tapered from the opening to the base (see, e.g. FIGS. 2 and 3). The presence of a base-sized recess in the lid further facilitates stacking of the packages, and helps prevent individual packages from sliding off of other packages on pallets 120 during transit and/or storage (see FIG. 4).

Meltable crack sealant packages according to the invention can be stored outdoors in the elements for at least one year in direct sunlight. During this period of exposure to the elements, the containers will not become brittle, and there is no possibility of water infiltration into the containers during this period of time.

Meltable crack sealant packages can be transported to the job site on pallets (e.g., as shown in FIG. 4) or as individual packages. The polymeric containers are very durable, and can withstand rough treatment and other abuse. They can be hauled in an unsecured manner in the beds of pickup trucks, for example.

The packages can be inserted, container and all, into conventional crack sealing application equipment such as, for example, direct fire kettles and oil jacketed applicators, which are known in the art. At the time of use, the heating equipment is turned on, and a package according to the invention is placed into the unit. The package is heated to a temperature within the range of about 350° F. to about 450° F. until the container and the crack sealant material both become molten and form a mixed molten liquid. The melted container serves as an additive that provides desirable characteristics to the crack sealant (e.g., low tack, high softening point, low penetration). The liquefied container and crack sealant material in the heating unit can then be applied to seal a joint or crack in a pavement surface by pouring or pumping in the conventional manner.

Advantageously, meltable crack sealant packages according to the invention eliminate debris at the job site. There are no more corrugated boxes to be removed, collected and recycled. Furthermore, because the entire package (container and material contained therein) is placed into the heating equipment, there is a time savings because the material does not need to be removed from the packaging before use. The rugged protective polymeric packaging can be handled roughly during transit and at the job site without product loss or damage to the containers. Prior art packages are not as durable, and thus if a package is broken/pierced, the crack sealant will escape from its container and readily adhere to anything it contacts. Prior art containers that are not as durable can be damaged, which leads to a time and material expense to clean the leaked material off of surfaces where the material should not have been applied, which is difficult and messy.

As noted above, the package is watertight, which means that it can be stored outside without worry of sunlight damage, molten material escaping package, water damaging the packaging etc. With reference to FIG. 3, the inner portion of the container defines a volume that contains the crack sealant, and which cannot be infiltrated by water or other foreign material from an outer portion of the container.

Corrugated containers cannot be stored where they are exposed to the elements. Containers made of expanded polystyrene are believed to exhibit some porosity, which allows for the absorption/accumulation of rainwater. And packages made of non-woven packaging materials are not watertight, require the use of adhesives, have non-rigid sidewalls that do not retain their shape in the event the product stored within becomes soft due to heat exposure, and can become brittle upon long-term exposure to ultraviolet radiation. Containers according to the present invention overcome all of these limitations.

The following examples are intended only to illustrate the invention and should not be construed as imposing limitations upon the claims.

Example 1

800 grams of an all-climate hot pour crack sealant (Dura-Fill HS available from P&T Products, Inc. of Sandusky, Ohio) was melted and then tested in accordance with ASTM Tests D 5239-09, D 36 and modified D 3121. The modifications to D 3121, which is a Standard Test for Tack of Pressure-Sensitive Adhesives by Rolling Ball, involved pouring the molten crack sealant material at a temperature of 345° F. into a metal tack test mold (3" wide×10" long×0.125" deep) lined with release paper. After the crack sealant material was allowed to cool at room temperature (~72° F.) for two hours, the track was inclined at an angle of 10°. A 7/16" steel ball was placed atop the test track, the ball released, and allowed to roll down the track onto the solidified material. The distance of travel by the ball was measured and recorded in millimeters. Throughout the instant specification and in the appended claims the term "modified ASTM D 3121" shall refer to the ASTM D 3121 test as modified above. The testing results are reported in Table I.

Example 2

850.8 grams of the same crack sealant used in Example 1 and 1.80 grams of poly bag material were melted together and tested using the same testing procedures as indicated in Example 1. The ratio of crack sealant material and poly bag material was intended to approximate as closely as possible the amount of poly bag material melted into the crack sealant material when the same is packaged using a conventional poly-bag lined cardboard box. The testing results are reported in Table I.

Example 3

804.4 grams of the same crack sealant used in Example 1 and 44 grams of expanded polystyrene were melted together and tested using the same testing procedures as indicated in Example 1. The ratio of crack sealant material and expanded polystyrene was intended to approximate as closely as possible the amount of expanded polystyrene melted into the crack sealant material when the same is packaged as described in U.S. Pat. No. 8,017,681 to Guymon et al. The testing results are reported in Table I.

Example 4

832.6 grams of the same crack sealant used in Example 1, 2.00 grams of poly bag material and 2.00 grams of Tyvek® packaging material were melted together and tested using the same testing procedures as indicated in Example 1. The ratio of crack sealant material, poly bag material and Tyvek® packaging material was intended to approximate as closely as possible the amount of such materials melted into the crack sealant material when the same is packaged as sold by Crafco Inc. of Chandler, Ariz. under the PLEXI-MELT™ brand. The testing results are reported in Table I.

Example 5

850.0 grams of the same crack sealant used in Example 1 and 34.0 grams of polypropylene homopolymer were melted together and tested using the same testing procedures as indicated in Example 1. The ratio of crack sealant material and polypropylene homopolymer was intended to approximate as closely as possible the amount of polypropylene homopolymer that would be melted into the crack sealant material when the same is packaged according to the invention. The testing results are reported in Table I.

TABLE I

|  | ASTM Test | Typical Range | Example 1 | Example 2 | Example 3 | Example 4 | Example 5 |
|---|---|---|---|---|---|---|---|
| Penetration dmm | D 5329 | 28-38 | 34 | 29 | 31 | 29 | 16 |
| Softening Point, ° F. | D36 | 200-208 | 205.4 | 203.9 | 205.8 | 205.4 | 213.9 |
| Tack, mm | D3121 (modified) | 140-190 | 140 | 185 | 160 | 180 | >250 |

The data reported in Table 1 shows that only Example 5, which is a crack sealant packaged in accordance with the invention, achieves an improvement in penetration that is better than the typical range observed for such material. The improvement is significant (a ~52.9% reduction in penetration) as compared with the base material alone (Example 1). This is significant because the higher the penetration test result, the "softer" the crack sealant. For many applications, it is best to have a low penetration test in order to withstand the elements of foot traffic, power steering, and shopping carts.

The data reported in Table 1 also shows that only Example 5, which is a crack sealant packaged in accordance with the invention, achieves an improvement in softening point that is better than the typical range observed for such material. Again, the improvement is significant (a 4.1% increase in softening temperature) as compared with the base material alone (Example 1). This test generally measures the temperature at which the material becomes soft. Areas with warmer climates need to pay close attention to this property because pavement temperatures can exceed 150° F. when the ambient air temperature is only 90° F. A higher softening point is a significant improvement in the performance of the material.

The data reported in Table 1 also shows that only Example 5, which is a crack sealant packaged in accordance with the invention, achieves an improvement in tack. The improvement is greater than >44% (the length of the test surface was 250 mm, and the ball would have continued beyond 250 mm if the test surface was longer), which is significant. It is desirable to have a less tacky surface quickly, so that crews can continue to work sooner. Furthermore, the quick reduction in tack allows crews to apply sealcoat or open the work to traffic sooner than if the crack sealant used was contained within packaging according to the prior art.

Additional advantages and modifications will readily occur to those skilled in the art. Therefore, the invention in its broader aspects is not limited to the specific details and illustrative examples shown and described herein. Accordingly, various modifications may be made without departing from the spirit or scope of the general inventive concept as defined by the appended claims and their equivalents.

What is claimed is:

1. A meltable crack sealant package consisting essentially of:
   a polymeric container formed of non-expanded polypropylene homopolymer, said polymeric container having a base portion and an upwardly extending sidewall that terminates in a rim that defines an opening, said polymeric container defining a receptacle;
   a polymeric lid formed of non-expanded polypropylene homopolymer, said polymeric lid operatively engaging with the polymeric container to close off the opening and thereby seal the receptacle in a watertight manner; and
   a crack sealant material contained within the sealed reservoir of the container, said crack sealant material being a solid at temperatures up to at least 100° F.;
   wherein said meltable crack sealant package is capable of being heated to a temperature within the range of from about 350° F. to about 450° F. to form a molten liquid material for application to pavement surfaces to seal joints and cracks therein.

2. The meltable crack sealant package according to claim 1 wherein an area of the opening in the polymeric container is larger than an area of a periphery of the base portion, and wherein said polymeric lid includes a recess that is dimensioned to receive the base of an identical meltable crack sealant package.

3. The meltable crack sealant package according to claim 2 wherein said upwardly extending sidewalls taper from the opening to the periphery of the base portion.

4. The meltable crack sealant package according to claim 1 wherein the polymeric container is self-supporting and does not deform when ten identical packages of meltable crack sealant packages are stacked thereon for two weeks at 90° F.

5. The meltable crack sealant package according to claim 1 wherein the polymeric container and polymeric lid, when melted together with the crack sealant material contained therewithin, improves at least one characteristic selected from the group consisting of:
   the penetration of the applied crack sealant material as measured according to ASTM D 5329;
   the softening point of the applied crack sealant material as measured according to ASTM D 36; and
   the tack of the applied crack sealant material as measured by a modified ASTM D 3121.

6. A method of forming a meltable crack sealant package comprising:
   providing a polymeric container consisting essentially of non-expanded polypropylene homopolymer, said polymeric container having a base portion, at least one upwardly extending sidewall terminating in a rim that defines an opening, said polymeric container defining a receptacle;
   providing a polymeric lid consisting essentially of non-expanded polypropylene homopolymer for the polymeric container;
   pouring a molten crack sealant material that is at a temperature below about 300° F. into the receptacle of the container;
   operatively engaging the polymeric lid with the rim of the polymeric container to close off the opening and thereby seal the crack sealant material within the receptacle in a watertight manner; and
   allowing the container to cool to a temperature below about 100° F. such that the crack sealant material sealed within the receptacle becomes a solid.

7. A method of sealing a crack or joint in a pavement surface, the method comprising:
   providing a meltable crack sealant package according to claim 1;
   heating the meltable crack sealant package to a temperature within the range of from about 350° F. to about 450° F. to form a molten liquid material; and
   applying the molten liquid material to the pavement surface to seal the joint or crack therein.

8. A meltable crack sealant package consisting essentially of:
- a polymeric container formed of non-expanded polypropylene homopolymer, said polymeric container having a base portion and an upwardly extending sidewall that terminates in a rim that defines an opening, said polymeric container defining a receptacle;
- a polymeric lid formed of non-expanded polypropylene homopolymer, said polymeric lid operatively engaging with the polymeric container to close off the opening and thereby seal the receptacle in a watertight manner;
- a handle pivotally secured to the lid or to the polymeric container, said handle being selectively movable between a non-operational position wherein said handle is adjacent to said upwardly extending sidewalls and an operational position wherein said handle is above said lid portion; and
- a crack sealant material contained within the sealed reservoir of the container, said crack sealant material being a solid at temperatures up to at least 100° F.;
- wherein said meltable crack sealant package is capable of being heated to a temperature within the range of from about 350° F. to about 450° F. to form a molten liquid material for application to pavement surfaces to seal joints and cracks therein.

9. The meltable crack sealant package according to claim 8, wherein an area of the opening in the polymeric container is larger than an area of a periphery of the base portion, and wherein said polymeric lid includes a recess that is dimensioned to receive the base of an identical meltable crack sealant package.

10. The meltable crack sealant package according to claim 9, wherein said upwardly extending sidewalls taper from the opening to the periphery of the base portion.

11. The meltable crack sealant package according to claim 8, wherein the polymeric container is self-supporting and does not deform when ten identical packages of meltable crack sealant packages are stacked thereon for two weeks at 90° F.

12. The meltable crack sealant package according to claim 8, wherein the polymeric container and polymeric lid, when melted together with the crack sealant material contained therewithin, improves at least one characteristic selected from the group consisting of:
- the penetration of the applied crack sealant material as measured according to ASTM D 5329;
- the softening point of the applied crack sealant material as measured according to ASTM D 36; and
- the tack of the applied crack sealant material as measured by a modified ASTM D 3121.

13. A method of sealing a crack or joint in a pavement surface, the method comprising:
- providing a meltable crack sealant package according to claim 8;
- heating the meltable crack sealant package to a temperature within the range of from about 350° F. to about 450° F. to form a molten liquid material; and
- applying the molten liquid material to the pavement surface to seal the joint or crack therein.

* * * * *